United States Patent [19]  
Lind, Jr.

[11] 4,080,993  
[45] Mar. 28, 1978

[54] IN-LINE FLOW-CONTROL VALVE
[75] Inventor: Charles F. Lind, Jr., Los Angeles, Calif.
[73] Assignee: Aqueduct, Inc., Los Angeles, Calif.
[21] Appl. No.: 700,407
[22] Filed: Sep. 13, 1976
[51] Int. Cl.² .............................................. G05D 7/01
[52] U.S. Cl. ................................................ 137/504
[58] Field of Search ................. 137/501, 503, 504; 251/121; 138/46

[56] References Cited  
U.S. PATENT DOCUMENTS

| | | | |
|---|---|---|---|
| 1,221,660 | 4/1917 | Bice | 251/121 X |
| 2,800,141 | 7/1957 | Hedland | 137/504 X |
| 2,845,087 | 7/1958 | Thomas | 137/504 |
| 3,015,341 | 1/1962 | Hedland et al. | 137/504 X |
| 3,130,747 | 4/1964 | Benaway | 137/504 |
| 3,431,944 | 3/1969 | Sakuma | 137/504 X |

Primary Examiner—Robert G. Nilson  
Attorney, Agent, or Firm—Bruce L. Birchard

[57] ABSTRACT

Sensitive control of the rate of flow of a fluid under pressure over a wide range of pressures and over a wide range of pressure differentials is effected by a valve comprising a pair of telescoping piston and regulator elements movable relative to each other against the biasing action of a spring when the fluid pressure upon the valve exceeds a predetermined level, the relative motion of the two elements (the upstream piston element and the downstream regulator element) resulting in a degree of closure of ports in the downstream regulator element which depends on the degree to which the pressure differential across the valve differs in magnitude from a pre-selected pressure differential. A critical relationship of the areas of piston ports, regulator ports and fixed-area exit orifice is defined which gives novel and unexpected flow-rate control over wide pressure differentials across the valve.

3 Claims, 6 Drawing Figures

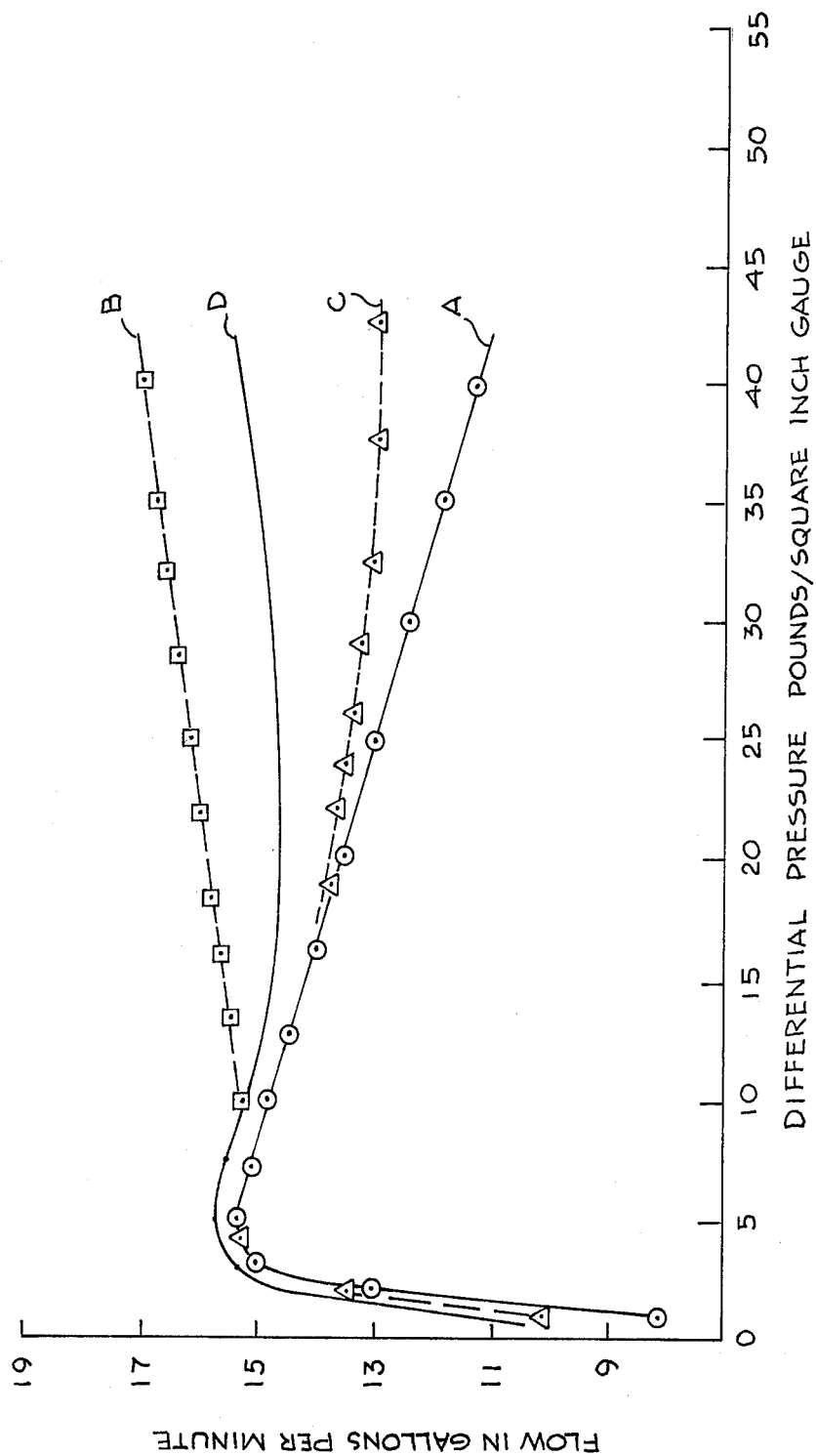

IN-LINE FLOW-CONTROL VALVE

BACKGROUND OF THE INVENTION

1. Field of the Invention

This invention relates to fluid control valves and, more specifically, to valves which are capable of automatically controlling fluid flow to a predetermined rate despite line pressure variations.

2. Description of the Prior Art

In large buildings of modern construction, heating or cooling fluids are pumped from a central boiler or refrigeration unit through an extensive network of pipes to individual heat exchangers positioned for optimum comfort of the occupants of the building. Because of the frictional forces experienced by the fluids in flowing to distant heat exchangers, significant line pressure drops occur and the rate of flow through the distant heat exchangers, being a direct function of fluid pressure, is low, with unsatisfactory heating or cooling results. These heating or cooling systems are closed fluid-flow systems. Similar undesirable effects are experienced in open fluid-flow systems, for example, in supplying hot or cold water to many outlets of varying distances from a water source.

One approach to equalizing the fluid is to install manually adjustable valves on the upstream side of those utilization devices or outlets which are near the central fluid source. By partially closing such valves, a resistance to flow is inserted in the line to the associated exchanger or outlet and the rate of fluid flow at the most distant exchangers or outlets. Unfortunately, such valves do not assure uniform fluid flow under varying source or head pressures and improper heating or cooling action or excessive fluid use occurs.

Therefore, it is an object of this invention to provide a flow-control valve which overcomes the various problems and disadvantages which have been described hereinbefore as being encountered in the use of fluid-control valves of the prior art.

It is a further object of the present invention to provide a fluid-flow control valve which will assure fluid flow at a predetermined rate despite wide ranges in source pressure variations.

It is a still further object of the present invention to provide a fluid-flow control valve which is simple in construction and effective despite small pressure differentials across it.

It is an additional object of the present invention to provide a fluid-flow control valve which is bi-laterally effective and suffers minimally from failures due to occlusion by foreign particles in the flow-control mechanism.

SUMMARY OF THE INVENTION

Stated briefly, this invention resides in a fluid-flow control valve having telescoping piston and regulator elements movable relative to each other in opposition to the force of a spring under compression when the fluid pressure differential across the valve departs from a predetermined value. The relative motion of the two piston elements results in varying degrees of closure of the regulator ports, thus limiting the volume of fluid flow to a predetermined amount. In one embodiment of the invention both the upstream piston and downstream regulator are movable against a compression spring which is external to both elements. Either element is capable, upon its moving, to close in varying degrees, the side ports in the regulator element, thereby compensating for pressure differential changes arising from either upstream or downstream fluid pressure increases beyond normal levels. Further, placing the compression spring external to the piston elements accomplishes two desirable ends: 1. The spring is out of the fluid flow channel and thus does not constrict that channel in any way; and, 2. Particulate matter carried by the fluid does not accumulate in the spring helix and, therfore, failure of the valve from such a cause is avoided.

Further, a critical area relationship between either piston or regulator side ports and an axially positioned exit orifice is defined which results in an unexpected degree of flow-rate control not heretofore achieved.

BRIEF DESCRIPTION OF THE DRAWINGS

A better understanding of the present invention may be had from a consideration of the following detailed description, taken in conjunction with the accompaying drawings in which.

DETAILED DESCRIPTION OF THE PREFERRED EMBODIMENTS

Figure 1:
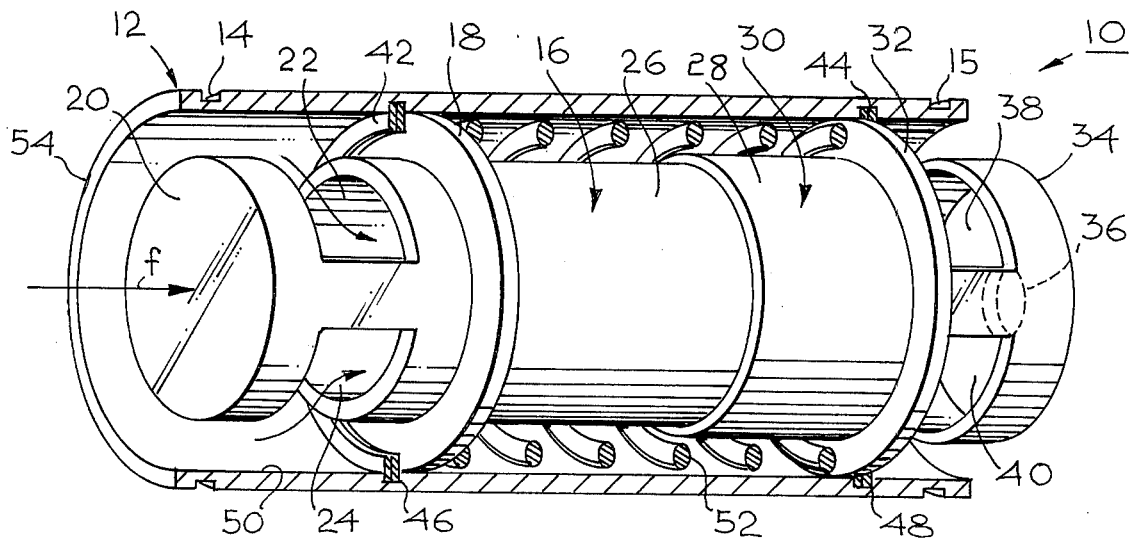
FIG. 1 is an isometric view, partially cut away, showing one embodiment of a flow-control valve according to the present invention.

Flow-control valve 10 includes hollow casing 12 having annular recesses 14 and 15 in the outer surface thereof for securing valve 10 in a piping system by means of commercially available clamps, or the like. Such a combination makes insertion of valve 10 in an existing fluid distribution system simple. Upstream piston 16 carries concentric flange 18 fixedly on its external surface. Piston 16 has closed end cap 20 and inlet orifices such as orifices 22 and 24. Piston 16 has, in addition, skirt portion 26 which extends slidably into skirt portion 28 of downstream piston or regulator 30. Downstream piston or regulator 30 carries concentric flange 32 fixedly on its external surface and has end cap 34 in which axially positioned exit orifice 36 is provided. Exit ports 38 and 40 are also provided.

Piston 16 and regulator 30 are retained within casing 12 by retainer rings 42 and 44 seated in cooperating recesses 46 and 48 in its inner wall 50. Spring 52 urges flange 18 into engagement with retainer ring 42 and flange 32 into engagement with retainer ring 44. It should be understood that flanges 18 and 32 can move freely along the axis of and within the inner surface of casing 12. With flanges 18 and 32 resting against retainer rings 42 and 44, respectively, the downstream end of skirt 26 is proximate to the upstream edges of ports 38 and 40.

Fluid entering valve 10 at inlet end 54 produces a force f on end cap 20 urging piston 16 to move in the direction of fluid flow against the restoring force of spring 52. The spring constant of spring 52 is chosen to correspond to the anticipated average fluid pressure on end cap 20. When that average condition obtains skirt 26 of piston 16 does not impinge upon outlet-ports 38 and 40. Springs with differing spring constants may be substituted for spring 52 to adapt flow-control valve 10 to differing pressure environments.

When the fluid pressure on end cap 20 exceeds a predetermined limit, upstream piston 16 moves downstream and its skirt 26 produces partial or total closure of exit ports 38 and 40, depending on the amount to which the upstream pressure exceeds a predetermined level. So long as exit ports 38 and 40 are closed by excessive fluid pressure on cap 20, end cap 34 with its axially positioned exit orifice 36 acts as a fixed orifice plate.

If a reverse pressure surge occurs, that is one from the downstream direction, an abnormal force will arise on the downstream side of end cap 34 causing movement of downstream piston or regulator 30 in an upstream direction with a partial or total closure of ports 38 and 40 as they move over skirt 26 of upstream piston 16.

As can be seen from FIG. 1, spring 52 is external to pistons 16 and 30. While it may also be internal to the pistons, its external positioning places it out of the path of fluid flow through the valve and reduces fluid friction while, at the same time, preventing the accumulation in the valve members of particulate matter such as rust and sand, commonly found in fluid distribution systems, particularly open systems. The elimination of this accumulation or occlusion reduces the maintenance problems and costs experienced with valves having internally located springs and improves system reliability.

While valve 10 has been shown as having upstream piston 16 telescoping within regulator 30 and outlet ports 38 and 40 being the fluid rate control ports as skirt 26 moves over them, the reverse relationship is equally operable, i.e., with regulator 30 telescoping within upstream piston element 16, the skirt of regulator 30 being extended to be proximate to the downstream edges of orifices 22 and 24 when flange 32 is resting against retainer ring 44 and flange 18 is resting against retainer ring 42.

To extend the usability of valve 10 over a greater range of pressures, means for adjusting the size of inlet orifices 22 and 24 can be provided. Devices for achieving this end are shown in FIGS. 2 and 2A.

Figure 2:
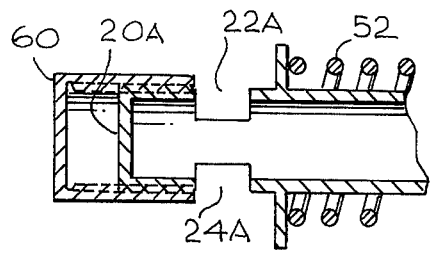
FIG. 2 is a cross-sectional view of a modification of a portion of the flow-control valve of FIG. 1.

In FIG. 2, inlet orifice adjusting cap 60 is shown threadably engaging end cap 20A. By turning cap 60 so that it covers, partially, inlet ports 22A and 24A, a fixed flow-control parameter may be introduced in the valve.

Figure 2A:
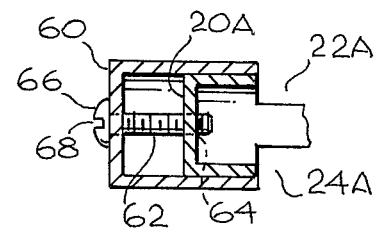
FIG. 2A is a cross-sectional view of a variation of the modification of FIG. 2.

An alternate method of making cap 60 adjustable over end cap 20A is shown in FIG. 2A. In FIG. 2A, cap 60 carries threaded member 62 in fixed relation thereto. Adjusting cap 60 fits slidably over end cap 20A. End cap 20A has a tapped opening 64 therein receiving member 62. Head 66 is provided with a slot 68 over ports 22A and 24A. Of course, with upstream piston 16 out of casing 12 the adjustment of port size can be done by merely turning cap 60.

Alternatively, adjusting cap 60 may be provided with orifices of its own and may be supported over inlet ports 22A and 24A so that, by rotation of cap 60, its orifices may be made to coincide with ports 22A and 24A or with the piston segments joining end cap 20 to the remainder of upstream piston 16, thus controlling the pressure drop through valve 10.

Figure 3:
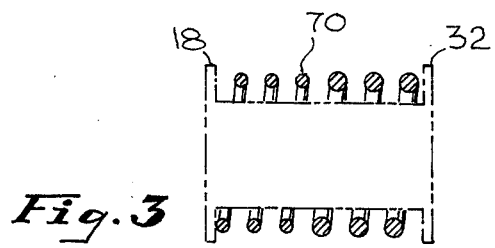
FIG. 3 is a cross-sectional view of an alternate form of one element of the embodiment of FIG. 1.

Another means for extending the useful operating-pressure range of valve 10 is to incorporate, between flanges 18 and 32, a compound spring or one having a spring constant which is variable with the degree of its compression. The latter type of spring is represented in FIG. 3. The material of the spring helix 70 is seen to be of greater diameter at its end engaging flange 32 than it is at its end engaging flange 18.

Minor pressure deviations above a predetermined level compress the lighter coils of the spring while severe excesses in inlet pressures cause the heavier spring coils to be compressed. The same general effect can be realized by having a spring of lower spring constant spanning the distance between flanges 18 and 32 under no fluid pressure and by having a spring of higher spring constant but of shorter length positioned with one end engaging downstream piston flange 32, the other end thereof engaging upstream piston flange 18 only after the weaker spring has been partially compressed.

Figure 4:
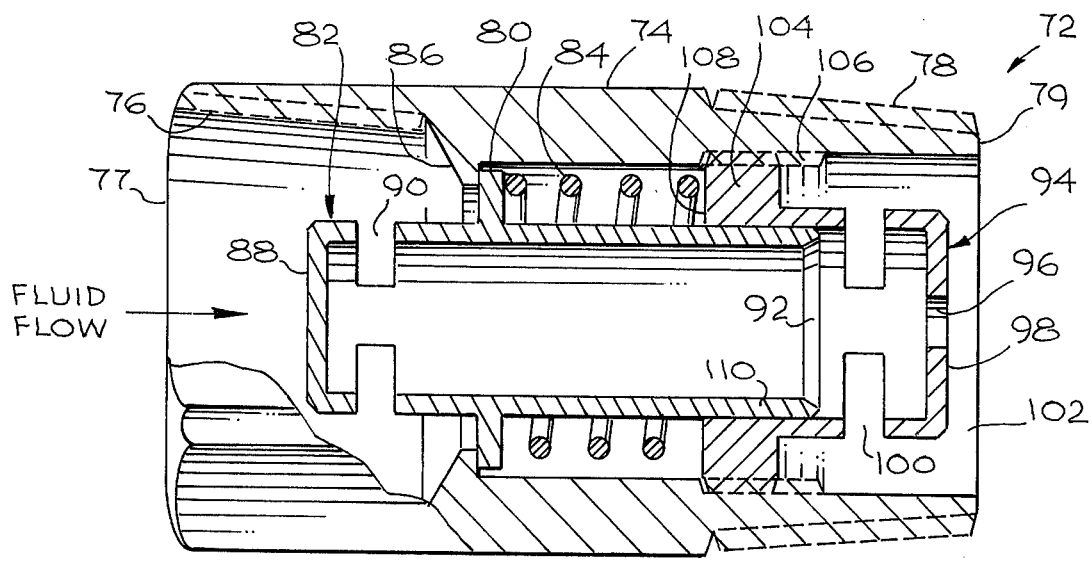
FIG. 4 is a cut-away view of an additional embodiment of the present invention; and, FIG. 5 is a graph showing the critical relationship between piston or regulator side port area and axially positioned exit orifice area in achieving optimum flow rate control.

In FIG. 4, a low cost, simplified version of a flow-control valve according to the present invention is shown. In FIG. 4, flow-control valve 72 has case 74 in the form of a nipple, that is, with female threads 76 at its upstream end 77 and male threads 78 at its downstream end 79, for easy insertion of valve 72 in an existing fluid distribution network.

Flange 80 of movable piston element or piston 82 rests, under the urging of spring 84 against concentric shoulder 86, when a predetermined normal pressure prevails on end cap 88. Inlet ports 90 are provided in the sidewalls at the upstream end of piston or piston element 82, the exit end 92 of piston 82 being fully open, as shown.

Piston 82 cooperates telescopically with regulator or fixed piston 94 which has an axially alligned exit orifice 96 in its end cap 98 and a plurality of exit ports 100 cooperating with outlet opening 102 in valve 72.

Cylinder or fixed piston 94 has an externally threaded connecting portion 104 which cooperates with internal threads 106 in case 74 to permit easy insertion and removal of piston 82, spring 84 and fixed piston or regulator 94 in valve 72. As can be seen from FIG. 4, the downstream end of spring 84 rests on the upstream face 108 of connector portion 104 in fixed piston or regulator 94.

Fluid flowing inwardly at upstream end 77 of valve 72 at a pressure exceeding that considered normal for the system, as predetermined by the choice of the spring constant of spring 84 (pressure losses in the upstream and downstream orifices of the valve having been considered in making the choice) will move piston 82 downstream toward end 79 of valve 72 with the result that skirt 110 of piston 82 will move over part or the whole of the length of exit ports 100, restricting the volume of fluid flowing from outlet opening 102 of valve 72 to a predetermined amount. When skirt 110 has only partially covered exit ports 100, fluid flows out of the portions of those ports remaining open and out of axially aligned exit orifice 96. With higher fluid pressures at the inlet end of valve 72, orifices 100 are completely covered and fluid can only exit from valve 72 through exit orifice 96. This latter condition occurs when the pressure of the fluid incident on end cap 88 exceeds tha anticipated in the system's design. A fixed orifice plate exists so long as this condition continues.

The volume of fluid flow through fluid-control valve 72 is, thus, a function of the incident fluid pressure on end cap 88 of piston 82, the spring constant of spring 84 for any particular degree of compression thereof, and the fluid pressure losses through exit orifices 96 and through ports 90 and 100. Thus, fluid flow volume can, with the present invention, be determined and maintained accurately under widely varying input pressure conditions.

The variable spring constant or compound spring design discussed in connection with FIG. 3 may be incorporated in this embodiment. This embodiment is particularly useful in open-ended systems, such as in water supplies to shower heads, or the like.

I have determined that a critical relationship exists between the area of the inlet or outlet ports and the area of the axially aligned exit orifice. This relationship applies to the bi-directional embodiment of FIG. 1 and to the embodiment of FIG. 4. The relationship is that the area of the axially aligned exit orifice should be one-eighth of the total side port area in either the piston or regulator. The side port areas of the piston and regulator are approximately equal. FIG. 5 shows the advantage obtained by utilizing the critical area relationship taught by this invention. Curve A shows the relationship between flow rate and pressure differential across a valve, such as valve 72. It is apparent that the flow rate varies significantly and in a disadvantageous fashion as a result of there being no axial exit orifice. The cause for this phenomenon is the turbulent (rather than laminar) flow through the valve which results from the lack of an axial exit orifice. A less objectionable, but still unacceptable, relationship is displayed in Curve C where the area of axial exit orifice is 57% of the area taught by this invention.

If the area of exit orifice 36 or 96 exceeds the one-eighth ratio with respect to the side port areas in the respective pistons or regulators the performance shown in Curve B results. There the flow rate rises unacceptably with pressure differential. The area of the axial exit orifice giving rise to Curve B was 128% of the optimum area taught by this invention.

Curve D shows the performance of a valve having the defined one-eighth area relationship taught by this invention. It is clear that the flow rate averages 15 gallons per minute over a broad range of differential pressures, a highly desirable characteristic not achieved without practicing this invention, particularly in low pressure systems.

While particular embodiments have been shown and described it will be evident to those skilled in the art that variations and modifications of those embodiments which have been described may be made without departing from this invention. It is the purpose of the appended claims to cover all of those variations and modifications, as well as the embodiments shown and described.

What is claimed is:

1. A fluid-flow control valve for maintaining the flow of a fluid at a predetermined rate despite departures from a predetermined level in the pressure causing the fluid flow, including;

hollow, cylindrical casing means having a fixed axis;
a cylindrical, hollow upstream piston element having at least one fluid inlet port therein and having an outside diameter;
a cylindrical, hollow downstream regulator element having fluid side-exit ports and an axially aligned, flow-controlling exit orifice therein and having an inside diameter exceeding said outside diameter, said piston element being coupled telescopically within said regulator element to provide the fluid flow path from said at least one inlet port to said side-exit ports and said exit orifice;
said casing means including internal means for supporting said upstream and downstream elements with their common axis coincident with said fixed axis and said casing means further including means for limiting the extent of the relative motion of said upstream and downstream elements;
spring means interposed between said upstream and downstream elements wholly external to said fluid flow path for urging relative motion therebetween along said fixed axis;
said upstream element having a skirt portion extending from said inlet ports to a region proximate to the upstream edges of said exit ports when said pressure causing said fluid-flow is at said predetermined level;
said upstream element being movable downstream and said downstream element being movable upstream;
said upstream and downstream elements being responsive to fluid pressure exceeding said predetermined level to effect relative movement therebetween in opposition to the restoring force of said spring whereby said skirt portion of said upstream portion covers, at least in part, said exit ports of said downstream element;
said axially aligned exit orifice having an area equal to one-eighth of the total area of said fluid side-exit ports.

2. A fluid-flow control valve for maintaining the flow of a fluid at a predetermined rate despite departures from a predetermined level in the pressure causing the fluid flow, including;

hollow, cylindrical casing means having a fixed axis;
a cylindrical, hollow upstream piston element having at least one fluid inlet port therein and having an outside diameter;
a cylindrical, hollow downstream regulator element having fluid side-exit ports and an axially aligned, flow-controlling exit orifice therein and having an inside diameter exceeding said outside diameter, said piston element being coupled telescopically within said regulator element to provide the fluid flow path from said at least one inlet port to said side-exit ports and said exit orifice;
said casing means including internal means for supporting said upstream and downstream elements with their common axis coincident with said fixed axis and said casing means further including means for limiting the extent of the relative motion of said upstream and downstream elements;
spring means interposed between said upstream and downstream elements wholly external to said fluid flow path for urging relative motion therebetween along said fixed axis;
said upstream element having a skirt portion extending from said inlet ports to a region proximate to the upstream edges of said exit ports when said pressure causing said fluid-flow is at said predetermined level;
said upstream element being movable downstream and said downstream element being movable upstream, said spring being external to both said upstream and downstream elements;

said upstream and downstream elements being responsive to fluid pressure exceeding said predetermined level to effect relative movement therebetween in opposition to the restoring force of said spring whereby said skirt portion of said upstream portion covers, at least in part, said exit ports of said downstream element;

said axially aligned exit orifice having an area equal to one-eighth of the total area of said fluid side-exit ports; and said upstream element including, in addition, adjusting means for adjusting the size of said inlet orifices.

3. A fluid-flow control valve for maintaining the flow of a fluid at a predetermined rate despite departures from a predetermined level in the pressure causing the fluid flow, including;

hollow, cylidrical casing means having a fixed axis;

a cylindrical, hollow upstream piston element having at least one fluid inlet port therein and having an outside diameter;

a cylindrical, hollow downstream regulator element having fluid side-exit ports and an axially aligned, flow-controlling exit orifice therein and having an inside diameter exceeding said outside diameter, said piston elememt being coupled telescopically within said regulator element to provide the fluid flow path from said at least one inlet port to said side-exit ports and said exit orifice;

said casing means including internal means for supporting said upstream and downstream elements with their common axis coincident with said fixed axis and said casing means further including means for limiting the extent of the relative motion of said upstream and downstream elements;

spring means interposed between said upstream and downstream elements wholly external to said fluid flow path for urging relative motion therebetween along said fixed axis;

said upstream element having a skirt portion extending from said inlet ports to a region proximate to the upstream edges of said exit ports when said pressure causing said fluid-flow is at said predetermined level;

said upstream and downstream elements being responsive to fluid pressure exceeding said predetermined level to effect relative movement therebetween in opposition to the restoring force of said spring whereby said skirt portion of said upstream portion covers, at least in part, said exit ports of said downstream element;

said axially aligned exit orifice having an area equal to one-eighth of the total area of said fluid side-exit ports; and, said at-least-one fluid inlet port having a total cross-sectional area which is equal to the total cross-sectional area of said side-exit ports.

* * * * *